United States Patent
Halder

(10) Patent No.: US 10,315,665 B2
(45) Date of Patent: Jun. 11, 2019

(54) SYSTEM AND METHOD FOR DRIVER PATTERN RECOGNITION, IDENTIFICATION, AND PREDICTION

(71) Applicant: Faraday&Future Inc., Gardena, CA (US)

(72) Inventor: Bibhrajit Halder, Palo Alto, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/418,641

(22) Filed: Jan. 27, 2017

(65) Prior Publication Data

US 2017/0217446 A1    Aug. 3, 2017

Related U.S. Application Data

(60) Provisional application No. 62/289,084, filed on Jan. 29, 2016.

(51) Int. Cl.

| | |
|---|---|
| *G01C 22/00* | (2006.01) |
| *G05D 1/00* | (2006.01) |
| *B60W 50/12* | (2012.01) |
| *B60W 10/04* | (2006.01) |
| *B60W 10/184* | (2012.01) |
| *B60W 10/20* | (2006.01) |
| *B60W 10/30* | (2006.01) |
| *B60W 30/18* | (2012.01) |
| *B60W 40/09* | (2012.01) |

(Continued)

(52) U.S. Cl.
CPC ............ *B60W 50/12* (2013.01); *B60W 10/04* (2013.01); *B60W 10/184* (2013.01); *B60W 10/20* (2013.01); *B60W 10/30* (2013.01); *B60W 30/18009* (2013.01); *B60W 40/09* (2013.01); *B60W 50/14* (2013.01); *G05D 1/021* (2013.01); *B60W 2050/0089* (2013.01); *B60W 2050/146* (2013.01); *B60W 2420/42* (2013.01); *B60W 2420/52* (2013.01); *B60W 2540/28* (2013.01); *B60W 2540/30* (2013.01); *B60W 2550/402* (2013.01); *B60W 2600/00* (2013.01); *G05D 2201/0213* (2013.01)

(58) Field of Classification Search
CPC .... B60W 50/12; B60W 10/04; B60W 10/184; B60W 10/20; B60W 10/30; B60W 30/18009; B60W 40/09; B60W 50/14; B60W 50/0097; G05D 1/021
USPC ...................... 701/25, 117; 340/426.1; 705/4
See application file for complete search history.

(56) References Cited

U.S. PATENT DOCUMENTS

| | | | |
|---|---|---|---|
| 9,141,582 B1* | 9/2015 | Brinkmann | ............. G06F 17/00 |
| 2009/0212929 A1* | 8/2009 | Drory | .................... B60R 25/10 |
| | | | 340/426.1 |

(Continued)

*Primary Examiner* — Mahmoud S Ismail
(74) *Attorney, Agent, or Firm* — Morrison & Foerster LLP

(57) ABSTRACT

Examples of the present invention are directed to a method and system of recognizing a driving pattern of a vehicle. Driver input controlling the vehicle can be received and stored in association with various sensor information (e.g., GPS location, camera data, radar data, etc.) and a timestamp. Then, driving patterns can be recognized from the stored information. For example, preferred routes, destinations, driving speeds, driving styles, etc. can be recognized. The driving patterns can be used by automated driving or driving assistance systems to automatically drive on preferred routes or to preferred destinations.

18 Claims, 4 Drawing Sheets

(51) Int. Cl.
| | |
|---|---|
| *B60W 50/14* | (2012.01) |
| *G05D 1/02* | (2006.01) |
| *G06F 19/00* | (2018.01) |
| *G06G 7/70* | (2006.01) |
| *G06G 7/76* | (2006.01) |
| *G06G 7/00* | (2006.01) |
| *B60R 25/10* | (2013.01) |
| *G06Q 40/00* | (2012.01) |
| *B60W 50/00* | (2006.01) |

(56) References Cited

U.S. PATENT DOCUMENTS

2012/0253661 A1* 10/2012 Tuukkanen ........ G01C 21/3492
 701/423
2017/0026472 A1* 1/2017 Bugenhagen ........... H04L 67/12
2017/0072850 A1* 3/2017 Curtis ............... B60W 50/0097

* cited by examiner

SYSTEM AND METHOD FOR DRIVER PATTERN RECOGNITION, IDENTIFICATION, AND PREDICTION

CROSS REFERENCE TO RELATED APPLICATION

This application claims the benefit of U.S. Provisional Patent Application No. 62/289,084, filed on Jan. 29, 2016, the entire disclosure of which is incorporated herein by reference in its entirety for all intended purposes.

FIELD OF THE DISCLOSURE

This relates generally to system and method for recognizing and predicting driver patterns.

BACKGROUND OF THE DISCLOSURE

Modern vehicles, especially automobiles, increasingly provide automated driving and driving assistance systems such as blind spot monitors, automatic parking, and automatic navigation. However, automated driving systems rely only on a driver's environment without taking into account driving history.

SUMMARY OF THE DISCLOSURE

Examples of the disclosure are directed to a method and system of recognizing a driving pattern of a vehicle. Driver input controlling the vehicle can be received and stored in association with various sensor information (e.g., GPS location, camera data, radar data, etc.) and accompanying timestamp information. By processing the stored information, driving patterns can be recognized from different respects. For example, preferred routes, destinations, driving speeds, driving styles, etc. can be recognized. Later, the driving patterns can be used by automated driving or driving assistance systems to automatically drive on preferred routes or to preferred destinations, etc. Further, in some examples, notifications can be triggered based on the driving patterns (e.g., to remind a driver when a favorite coffee shop is nearby).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
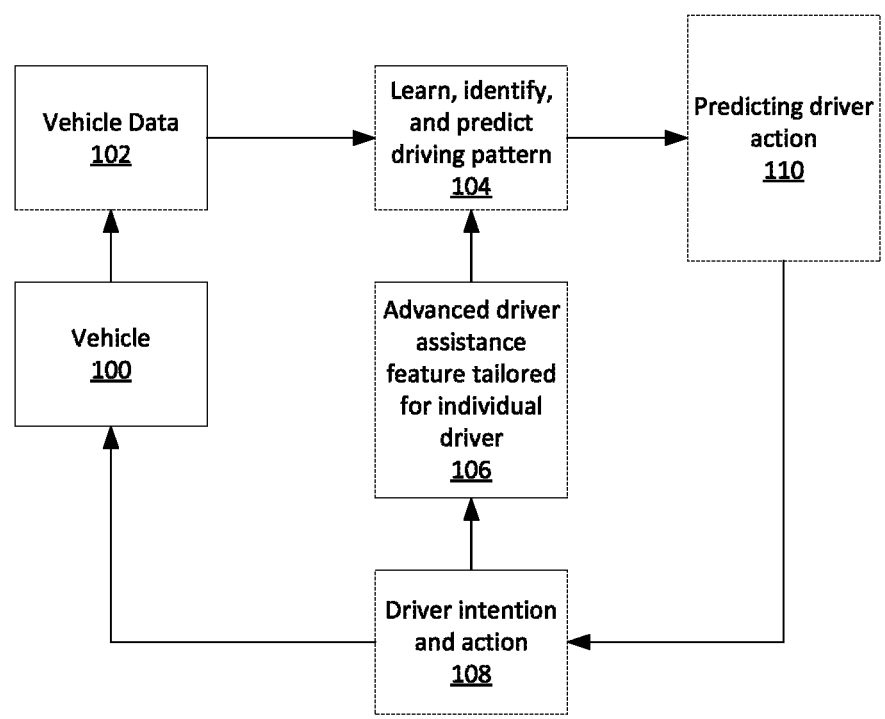
FIG. 1 illustrates an exemplary method of recognizing a driving pattern of a vehicle according to examples of the disclosure.

FIG. 1 illustrates an exemplary process of recognizing a driving pattern of a vehicle according to examples of the disclosure. The process illustrated in FIG. 1 can be realized by using one or more on-board processors of a vehicle executing certain software instruction. In accordance with a preferred embodiment, a vehicle 100 can collect vehicle data 102 based on vehicle data that can characterize driver intention and/or action 108. The vehicle data can include both driver input (e.g., steering angle, pedal depression, etc.), sensor information (e.g., GPS location, camera data, radar data, wheel speed, etc.), and timestamp information associated with the data. The vehicle can store the vehicle data on the vehicle itself and/or in cloud storage over a communication network, such as the internet.

Based on the stored vehicle data, the system (either a remote central server that is connected to the vehicle or the onboard computer of the vehicle itself, among other possibilities) can learn, identify, and predict a driving pattern 104. For example, the data can be analyzed to create a model for the driver associated with the vehicle data. In some examples, the vehicle can identify the driver via user input, biometric sensing, and/or other methods (e.g., fingerprint, face recognition, key fob recognition, mobile device recognition, etc.). Then, the vehicle data collected thereafter can be stored in association with the driver's identity and a model can be created for that driver's identity.

When the driver uses the vehicle at a later instance, the driving pattern/model can be used to predict or anticipate user-desired vehicle actions 110. The prediction can be determined based on sensor data from the vehicle. For example, when a driver returns to a previously visited location, a model in accordance with the preferred embodiment of the present invention can determine that the driver intends to perform similar actions 108 at that location as in the past. The vehicle can then automatically carry out the actions using advanced driver assistance features 106. For example, the vehicle can automatically take a driver's preferred exit on a freeway if the system recognizes that the driver usually takes that exit over other options.

Additionally or alternatively, a vehicle according to the present invention can trigger a notification informing the driver of a commonly visited destination that is nearby. For example, as a driver approaches a commonly visited coffee shop, the vehicle can display a notification informing the driver of the nearby coffee shop (e.g., the notification illustrated in FIG. 2). In some examples, the notification may only be triggered if vehicle data indicates that the driver does not intend to stop at the commonly visited destination (e.g., perhaps the driver has forgotten about the destination and needs a reminder). For example, if vehicle data indicates the driver is approaching the destination without slowing down, the vehicle may display the reminder notification. In various embodiments, the notification can be displayed on a center console display, dash display behind the steering wheel, or head up display projected on the windshield. Additionally or alternatively, a reminder may be delivered to the driver in the form of an audio message.

Figure 3:
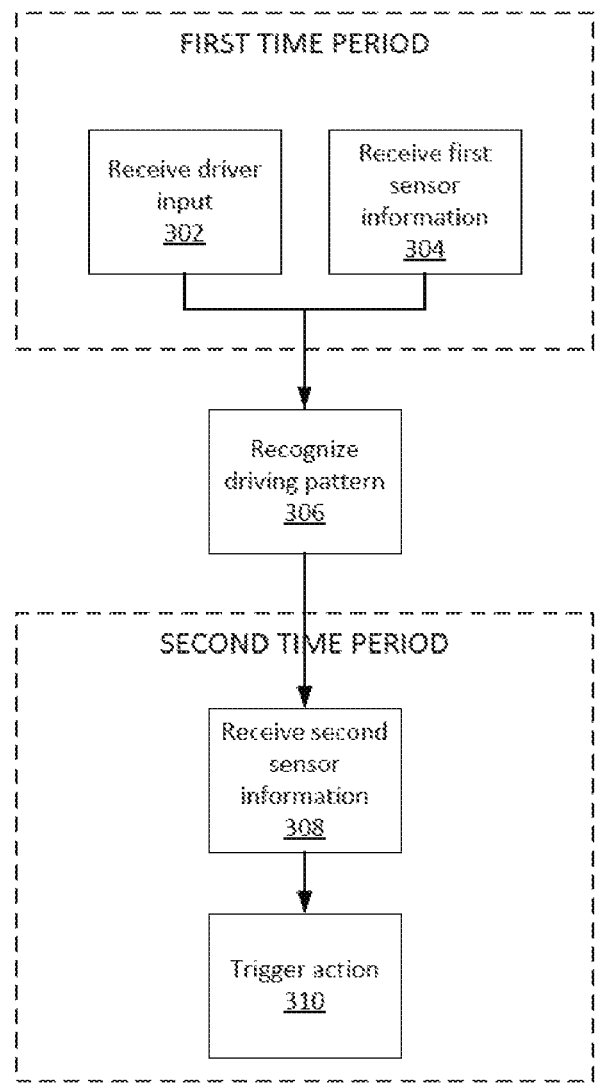
FIG. 3 illustrates an exemplary method of recognizing a driving pattern of a vehicle according to examples of the disclosure.

FIG. 3 illustrates an exemplary method of recognizing a driving pattern of a vehicle according to examples of the disclosure. During a first time period, the vehicle can receive (302) driver input controlling the vehicle (e.g., steering angle, pedal depression, etc.) and receive (304) first sensor information from one or more sensors. Sensor information can include a location of the vehicle obtained from GPS, radar data, camera data, wheel speed, etc.

A vehicle and/or one or more remote systems according to the preferred embodiment of the present invention can then recognize (306) a driving pattern based on the driver input and the first sensor information. For example, the vehicle and/or a remote system can store the driver input in association with one or both of the first sensor information and a timestamp associated with the first time period. A driving pattern may be recognized using statistical and machine learning methods. In some examples, the pattern recognition may be based on the principles that (1) a driver intends to perform the same actions whenever a particular location is visited (e.g., taking a particular route, stopping at a particular coffee shop on the way to work, etc.) and/or (2) a driver intends to perform the same actions at a particular time of day (e.g., listening to the same radio station every morning, taking a particular route in the morning vs. the evening, etc.).

In some examples, the vehicle can recognize an identity of a driver of the vehicle (e.g., using fingerprint, face recognition, key fob recognition, mobile device recognition, etc.) and store the driving pattern in association with the identity of the driver of the vehicle. For example, a first user can be recognized by the vehicle and a driving pattern can be stored in association with that user's identity. When that user is recognized by the vehicle at a later time, the stored driving pattern for that user can be loaded. If a different user is recognized, a different driving pattern may be loaded and/or a new driving pattern may be created based on the new user's driving actions.

In some examples, recognizing the driving pattern can include mapping location information received from sensors of the vehicle. For example, a preferred destination may be mapped and/or a preferred route to a destination may be mapped. In some examples, the location information may be used to supplement map data that does not include one or both of the preferred destination and a route to the preferred destination. For example, a private road may be mapped as a route to a private garage and stored in association with the driver's identity. The system can store this information even if the private road and the private garage are not routes or destinations in map data such as public map data. In some examples, the personalized mapping data may be used to trigger actions such as navigation on a private road or automatically opening a private garage door as the driver approaches.

During a second time period, the vehicle can receive (308) second sensor information from one or more sensors and, in accordance with the second sensor information matching first sensor information in the driving pattern, trigger (310) an action based on the driver input during the first time period.

For example, the action may be triggered in accordance with a current time being within a predetermined interval of the timestamp associated with the first time period (e.g., on a different day). That is, the vehicle may automatically trigger an action that was performed by the driver at the same time on a different day.

Figure 2:
FIG. 2 illustrates an exemplary notification according to examples of the disclosure.

In some examples, triggering the action may include displaying a notification on a display of the vehicle (e.g., the notification illustrated by FIG. 2). In some examples, the notification may be triggered to anticipate an action the driver might make. For example, a reminder of a commonly visited destination may be triggered as the driver approaches the destination but before the driver arrives.

In some examples, the notification may be triggered only when it becomes clear that the driver is not taking the action (e.g., if the driver forgot about a commonly visited destination, a reminder may be triggered). For example, the vehicle may receive additional driver input controlling the vehicle during the second time period. The vehicle may determine that the additional driver input during the second time period does not match the driver input during the first time period (e.g., the user is not braking to slow down at the commonly visited destination). In such a case, the vehicle may trigger the notification in accordance with determining that the additional driver input during the second time period does not match the driver input during the first time period.

In some examples, triggering the action may include actuating one or more actuator systems of the vehicle independent of corresponding driver input during the second time period. For example, triggering the action may include automated driving and/or driving assistance such as controlling the steering, adjusting the gas, adjusting the brake, etc., without the driver manually actuating such controls. Further, actuating one or more actuator systems of the vehicle during the second time period may correspond to at least a portion of the driver input during the first time period. For example, the triggered action may include automatically controlling the vehicle to replay driver input from a previous session, such as driving on a preferred route at a preferred speed.

In some examples, triggering the action may include configuring one or more climate or infotainment systems of the vehicle. For example, the infotainment system may be automatically tuned to a preferred radio station or a preferred playlist associated with the time of day (e.g., a preferred radio station for the morning commute vs. a preferred radio station for the evening commute). In some examples, the vehicle may not automatically turn on the audio, but if the user presses a power button to turn on the audio, the vehicle may automatically select preferred content based on the recognized pattern. Similarly, climate controls may be automatically set based on a recognized pattern, location, time of day, outdoor temperature, etc.

Figure 4:
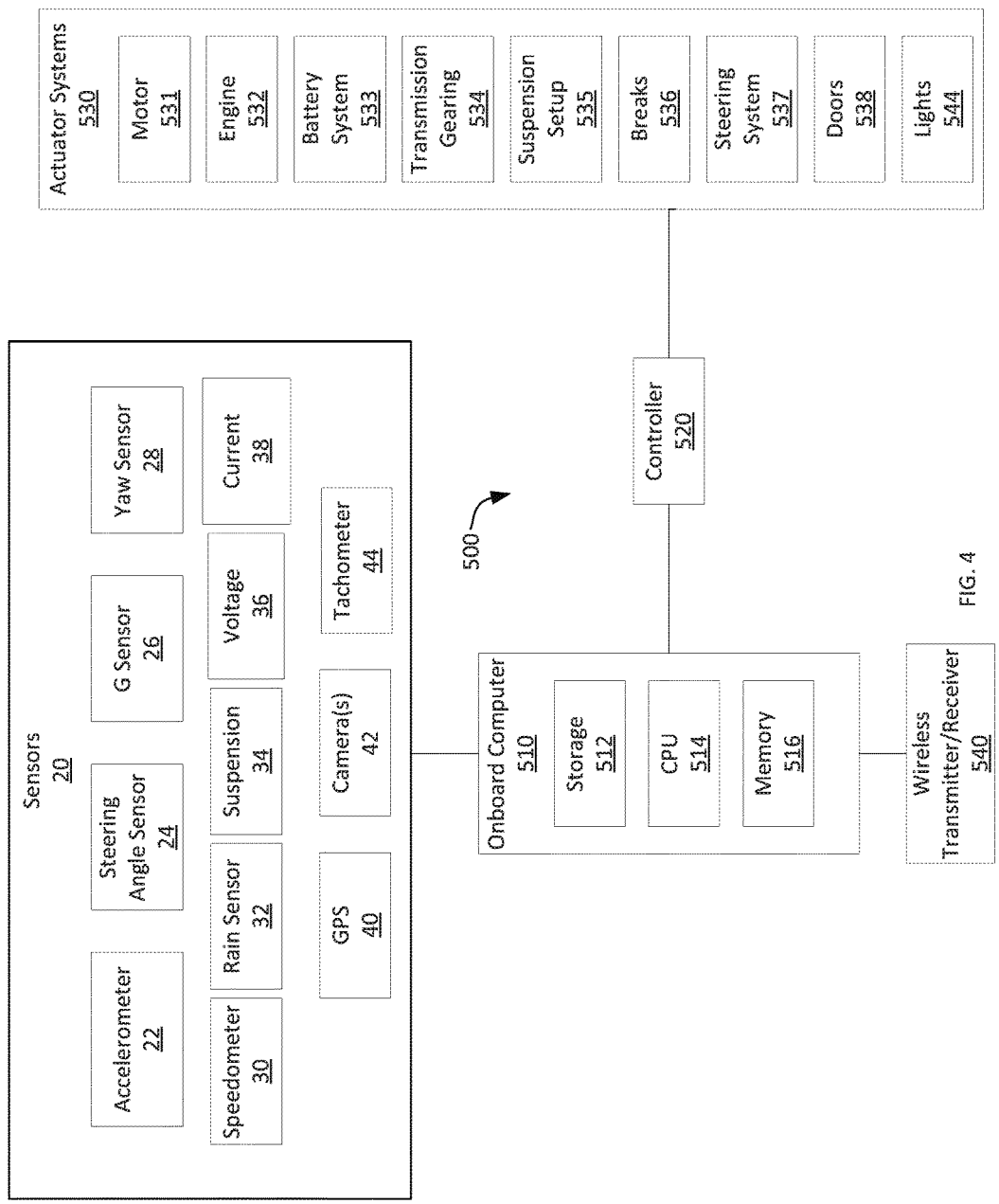
FIG. 4 illustrates a system block diagram according to examples of the disclosure.

FIG. 4 illustrates a system block diagram of a vehicle according to examples of the present invention. Vehicle control system 500 can perform any of the methods described with reference to FIGS. 1-3. System 500 can be incorporated into a vehicle, such as a consumer automobile. Other example vehicles that may incorporate the system 500 include, without limitation, airplanes, boats, or industrial automobiles. Vehicle control system 500 can include an on-board computer 510. On-board computer 510 can include storage 512, memory 516, and a processor 514. Processor 514 can perform any of the methods described with reference to FIGS. 1-3. Additionally, storage 512 and/or memory 516 can store data and instructions for performing any of the methods described with reference to FIGS. 1-3. Storage 512 and/or memory 516 can be any non-transitory computer readable storage medium, such as a solid-state drive or a hard disk drive, among other possibilities. The vehicle control system 500 can also include a controller 520 capable of controlling one or more aspects of vehicle operation.

In some examples, the vehicle control system 500 can be connected to (e.g., via controller 520) one or more actuator systems 530 in the vehicle. The one or more actuator systems 530 can include, but are not limited to, a motor 531 or engine 532, battery system 533, transmission gearing 534, suspension setup 535, brakes 536, steering system 537 door system 538, and lights system 544. Based on a recognized driver pattern, the vehicle control system 500 can control one or more of these actuator systems 530.

In some examples, the vehicle control system 500 can include one or more sensors 20 including, but not limited to:
an accelerometer 22 to determine the rate of acceleration of the vehicle;

a steering angle sensor 24 to determine the angle of the steering wheel as measured from a neutral position indicating that the front wheels of the vehicle are parallel and pointing straight forward;

a G or gravitational sensor 26 to determine the direction of gravity relative to the plane of the vehicle chassis;

a yaw sensor 28 to determine the orientation of the chassis with respect to direction of travel;

a speedometer 30 to determine the present speed of the vehicle;

a rain sensor 32 to determine whether the vehicle is operating in the rain;

a suspension sensor 34 to determine the stiffness of the suspension;

a voltage sensor 36 for measuring the battery voltage;

a current to measure 38 the current flow to or from the battery sensor;

a GPS receiver 40 to receive location information from the GPS satellite system;

one or more cameras 42 both for external and internal surveillance; and a tachometer 44.

Data from the one or more sensors 20 may be tracked and stored to create a user driving profile and/or to recognize a driving pattern as described above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A non-transitory computer-readable storage medium storing instructions which, when executed by one or more processors of a vehicle, cause the vehicle to perform a method of recognizing a driving pattern of the vehicle, the method comprising the steps of:

during a first time period:
   determining an identity of a driver of the vehicle by recognizing one or more of first biometric data, a first image of a face, a first key fob, and a first mobile device;
   receiving driver input data for controlling the vehicle,
   receiving first sensor information, the first sensor information comprising first location information, from one or more sensors of the vehicle;
   recognizing a driving pattern based on the identity of the driver, the driver input and the first sensor information;
   storing private location information including a location of a private road associated with the identity of the driver; and during a second time period after the first time period:
   determining the identity of the driver of the vehicle by recognizing one or more of second biometric data, a second image of the face, a second key fob, and a second mobile device;
   receiving second sensor information, the second sensor information comprising second location information, from the one or more sensors of the vehicle; and
   in accordance with the second location information matching the first location information in the driving pattern, triggering an action based on the driver input data received during the first time period, wherein recognizing the driving pattern includes storing the driver input data in association with the identity of the driver and one or both of the first sensor information and a timestamp associated with the first time period, and wherein triggering the action includes supplementing public map information with the private location information including the location of the private road and opening a private garage door associated with the identity of the driver of the vehicle.

2. The non-transitory computer-readable storage medium of claim 1, wherein the action is triggered in accordance with a current time being within a predetermined interval of the timestamp associated with the first time period.

3. The non-transitory computer-readable storage medium of claim 1, wherein triggering the action includes displaying a notification on a display of the vehicle.

4. The non-transitory computer-readable storage medium of claim 3, the method further comprising the steps of:
   receiving additional driver input controlling the vehicle during the second time period; and
   determining that the additional driver input during the second time period does not match the driver input during the first time period, wherein the action is triggered in accordance with determining that the additional driver input during the second time period does not match the driver input during the first time period.

5. The non-transitory computer-readable storage medium of claim 1, wherein triggering the action includes actuating one or more actuator systems of the vehicle independent of corresponding driver input during the second time period.

6. The non-transitory computer-readable storage medium of claim 5, wherein actuating one or more actuator systems of the vehicle during the second time period corresponds to at least a portion of the driver input during the first time period.

7. The non-transitory computer-readable storage medium of claim 1, wherein triggering the action includes configuring one or more climate or infotainment systems of the vehicle.

8. The non-transitory computer-readable storage medium of claim 1, wherein recognizing the driving pattern includes mapping the location information.

9. The non-transitory computer-readable storage medium of claim 8, wherein mapping the location information includes mapping a preferred route to a destination.

10. A vehicle, comprising:
   one or more processors;
   a memory storing instructions, which, when executed by the one or more processors, cause the vehicle to perform a method of recognizing a driving pattern of the vehicle, the method comprising the steps of:
   during a first time period:
      determining an identity of a driver of the vehicle by recognizing one or more of first biometric data, a first image of a face, a first key fob, and a first mobile device;
      receiving driver input data for controlling the vehicle;
      receiving first sensor information, the first sensor information comprising first location information, from one or more sensors of the vehicle;
      recognizing a driving pattern based on the identity of the driver, the driver input and the first sensor information;
      storing private location information including a location of a private road associated with the identity of the driver; and
   during a second time period after the first time period:

determining an identity of a driver of the vehicle by recognizing one or more of second biometric data, a second image of the face, a second key fob, and a second mobile device;

receiving second sensor information, the second sensor information comprising second location information, from the one or more sensors of the vehicle; and in accordance with the second location information matching the first location information in the driving pattern, triggering an action based on the driver input data received during the first time period, wherein recognizing the driving pattern includes storing the driver input data in association with the identity of the driver and one or both of the first sensor information and a timestamp associated with the first time period, and wherein triggering the action includes supplementing public map information with the private location information including the location of the private road and opening a private garage door associated with the identity of the driver of the vehicle.

11. The vehicle of claim 10, wherein the action is triggered in accordance with a current time being within a predetermined interval of the timestamp associated with the first time period.

12. The vehicle of claim 10, wherein triggering the action includes displaying a notification on a display of the vehicle.

13. The vehicle of claim 12, the method further comprising the steps of:

receiving additional driver input controlling the vehicle during the second time period; and determining that the additional driver input during the second time period does not match the driver input during the first time period, wherein the action is triggered in accordance with determining that the additional driver input during the second time period does not match the driver input during the first time period.

14. The vehicle of claim 10, wherein triggering the action includes actuating one or more actuator systems of the vehicle independent of corresponding driver input during the second time period.

15. The vehicle of claim 14, wherein actuating one or more actuator systems of the vehicle during the second time period corresponds to at least a portion of the driver input during the first time period.

16. The vehicle of claim 10, wherein triggering the action includes configuring one or more climate or infotainment systems of the vehicle.

17. The non-transitory computer-readable storage medium of claim 1, wherein triggering the action further includes navigating on the private road.

18. The non-transitory computer-readable storage medium of claim 1, wherein the action is triggered based on the identity of the driver of the vehicle.

* * * * *